Sept. 27, 1960 W. F. STEAGALL 2,954,481
DIGITAL MULTIVIBRATOR
Filed March 17, 1955 2 Sheets-Sheet 1
FIG. 1.
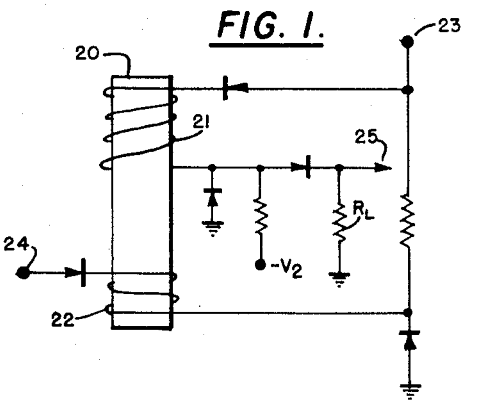
FIG. 2.
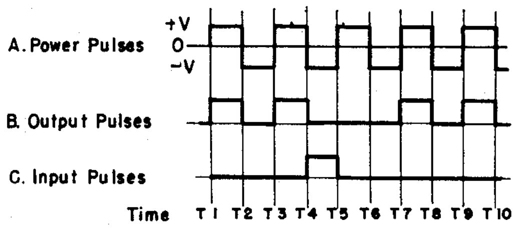
FIG. 3.
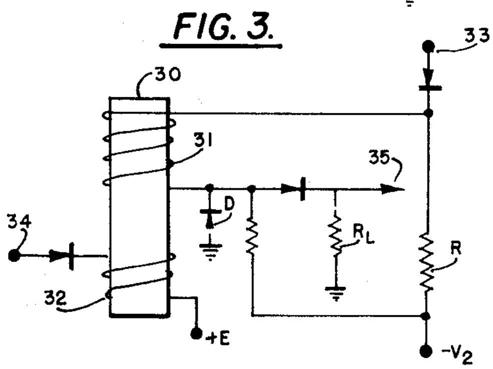
FIG. 4.
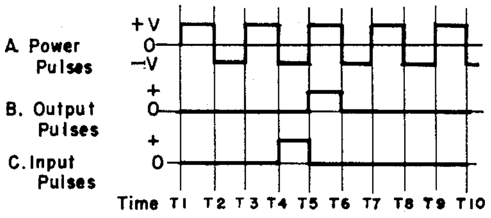
FIG. 5, FIG. 6.
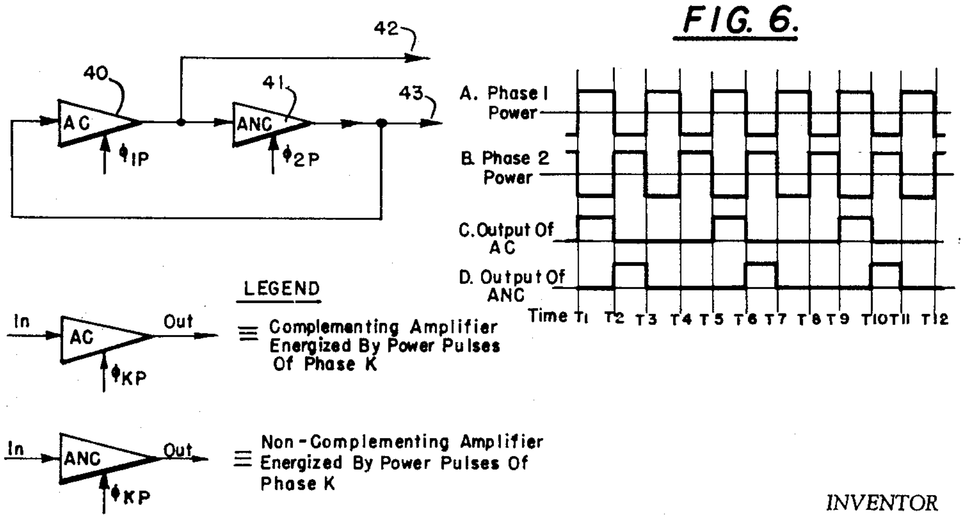
FIG. 5.
INVENTOR
WILLIAM F. STEAGALL
BY Charles E. English
AGENT

DIGITAL MULTIVIBRATOR

Filed March 17, 1955

2 Sheets-Sheet 2

INVENTOR
WILLIAM F. STEAGALL

BY Charles E. English
AGENT 2,954,481

DIGITAL MULTIVIBRATOR

William F. Steagall, Merchantville, N.J., assignor to Sperry Rand Corporation, a corporation of Delaware Filed Mar. 17, 1955, Ser. No. 494,937

24 Claims. (Cl. 307—88)

The present invention relates to pulse generating and pulse control circuits, and is more particularly concerned with pulse type amplifier circuits capable of operating as multivibrators. More specifically, the present invention relates to amplifier configurations finding particular utility in digital computing apparatuses, and capable of utilization in multivibrators, ring counters, frequency dividers, and multi-stable devices, and as control circuits in general.

In various electronic applications, and in particular in digital computation devices, it is often desired to provide circuits selectively generating trains of pulses of desired timing. In the past, such circuits have normally employed vacuum tube devices and have accordingly been subject to the disadvantages that the resulting structure is relatively fragile, raising serious questions of maintenance and the cost attendant thereto; and further, that these devices are of relatively large size, making the disposition of components somewhat difficult.

Various alternative components have been suggested for use in pulse generating and pulse control systems, and one such alternative configuration is the magnetic amplifier. The present invention is particularly, but not exclusively, concerned with circuits utilizing such magnetic amplifiers, it being understood that the broad concepts discussed hereinafter may be practiced with other forms of amplifiers, such as semi-conductor devices and electronic amplifiers.

In accordance with the present invention, pulse type amplifiers of both the complementing and non-complementing type may be interconnected in closed ring configurations to provide pulse generating and pulse control circuits capable of utilization in many forms of basic computation devices. In this respect it should be noted that a complementing amplifier is, by definition, one which will give an output when no input is presented thereto, or on the contrary, one which gives no output when there is in fact an input. Again, by definition, a non-complementing amplifier is one which will give an output only when an input is presented thereto.

To achieve certain of the advantages of the present invention, it is desirable to employ magnetic amplifiers of the above types; and in practice, such amplifiers may be energized by regularly occurring power pulses. As will become further apparent from the subsequent description, certain of these amplifiers employed in the practice of the present invention may be energized by "phase 1 power pulses" and this term merely refers to such regularly occurring pulses timed with respect to an arbitrary datum. Other of the amplifiers will in turn be energized by "phase 2 power pulses," and it is to be understood that this latter term again refers to pulses of substantially the same configuration as the phase 1 power pulses, but so displaced with respect to said datum that a positive-going portion of a phase 1 power pulse, for instance, will coincide with a negative-going portion of a phase 2 power pulse, and vice versa. It will also become apparent from the following description that when pulse type amplifiers of the type contemplated herein are in fact utilized, the several power pulse sources cooperate with input pulses fed to the amplifiers to selectively produce or inhibit an output from the amplifier concerned. Such input pulses will be termed "phase 1 input pulses," and "phase 2 input pulses," and in this respect, a phase 1 input pulse is defined as one capable of cooperating in the required manner with a phase 1 power pulse; while a phase 2 input pulse is defined as one capable of cooperating in the required manner with a phase 2 power pulse.

Recognizing the foregoing definitions, the present invention provides pulse type circuits normally utilizing a plurality of K complementing amplifiers, wherein K is an integer greater than or equal to 1; and a further plurality of N non-complementing amplifiers wherein N is an integer greater than or equal to 1; these pluralities of amplifiers being interconnected in closed ring configurations. In accordance with various special instances of the present invention, K may be equal to 1 and N may be an odd number, whereby the device acts as a multivibrator producing recurrent series of regularly occurring output pulses interposed by predetermined time intervals of no-pulse output. The number of pulses appearing in each of the said recurrent series of output pulses, as well as the time intervals intermediate successive series of pulses, will be dependent upon the number of non-complementing amplifiers actually placed in the closed configuration.

In accordance with further variations of the present invention, more than one complementer may be employed in the device in conjunction with a plurality of non-complementing amplifiers, and when such an arrangement is in fact utilized, a multivibrator is again achieved, producing spaced output pulses which may be taken from one or more of the amplifiers utilized. These arrangements are further characterized by the fact that they have multiple stable states which may be established by appropriate input pulses to selected ones of the amplifiers; and in a particular example discussed hereinafter, a tri-stable device, in accordance with the present invention, is in fact disclosed.

It is accordingly an object of the present invention to provide a novel pulse generating circuit.

A further object of the present invention resides in the provision of pulse control circuits utilizing a plurality of amplifiers connected in a closed ring configuration.

Still another object of the present invention resides in the provision of multistable pulse type devices utilizing a plurality of amplifiers.

Another object of the present invention resides in the provision of novel pulse type multivibrators.

Still another object of the present invention resides in the provision of novel pulse control circuits which are more rugged in configuration and less subject to operating failures than has been the case heretofore.

Another object of the present invention resides in the provision of pulse control circuits utilizing interconnected magnetic amplifiers which are capable of use as multivibrators, frequency dividers, ring counters, multistable devices, and as pulse generating and pulse control circuits in general.

The foregoing objects, advantages, construction and operation of the present invention will become more readily apparent from the following description and accompanying drawings, in which:

Figure 1 is a schematic diagram of a simple complementing magnetic amplifier such as may be employed in the present invention.

Figure 2 (A through C) are waveforms illustrating the operation of the device shown in Figure 1.

Figure 3 is a schematic diagram of a simple non-complementing magnetic amplifier such as may be employed in the practice of the present invention.

Figure 4 (A through C) are waveforms illustrating the operation of the circuit shown in Figure 3.

Figure 5 is a logical diagram of a multivibrator constructed in accordance with one embodiment of the present invention.

Figure 6 (A through D) are waveforms illustrating the operation of the circuit shown in Figure 5.

Figures 7, 8, 9:
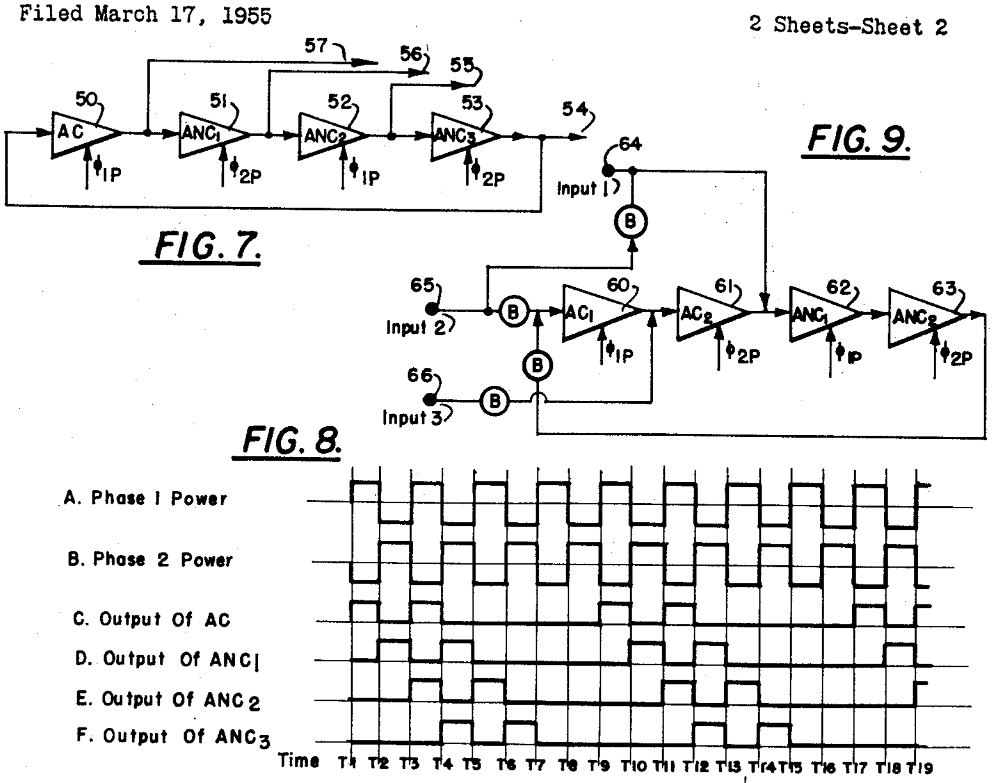
Figure 7 is a logical diagram of a more general form of multivibrator constructed in accordance with the present invention.
Figure 8 (A through F) are waveforms illustrating the operation of the circuit shown in Figure 7.
Figure 9 is a logical diagram of a further embodiment of the present invention capable of operation as a tristable device.

Before proceeding with the detailed description of the present invention, it should be noted that the various pulse generating and control circuits to be described may utilize both complementing and non-complementing magnetic amplifiers, such as have been disclosed in Figures 1 and 3, respectively. The precise operation of these forms of circuits is set forth, for instance, in my copending application Serial No. 424,880, filed April 22, 1954, for: "Bistable Devices Utilizing Magnetic Amplifiers," now Patent Number 2,709,798. To aid in the understanding of the present invention, however, a brief explanation of the operation of such magnetic amplifiers will now be given.

Referring to Figures 1 and 2, it will be seen that a complementing amplifier, such as may be employed in the present invention, may comprise a core 20 of magnetic material preferably, but not necessarily, exhibiting a substantially rectangular hysteresis loop. Such cores may be made of a variety of materials, among which are various types of ferrites and various kinds of magnetic tapes, including Orthonik and 4–79 Molypermalloy; and these materials may be given different heat treatments to effect different desired properties. It must be emphasized, however, that the present invention is not limited to any specific geometries of the cores utilized nor to any specific materials therefor; and the examples to be given are illustrative only. The core 20 carries two windings thereon, namely, a power or output winding 21 and a signal or input winding 22; and one end of the said power or output winding 21 is coupled to a source 23 of regularly occurring positive and negative-going power pulses of the configuration shown in Figure 2A. Similarly, one end of the signal or input winding 22 is coupled to a source 24 of selectively applied input pulses of the configuration shown in Figure 2C.

If we should assume that the core 20 is initially at its plus remanence operating point, each positive-going power pulse applied from the source 23 will effect a current flow through the winding 21, driving the core 20 from its plus remanence operating point into its plus saturation region. For this particular state of operation the coil 21 exhibits a relatively low impedance whereby substantially all the energy of the applied power pulses may pass through the winding 21, and successive output pulses will appear at the output point 25. Thus, referring to Figure 2, the positive-going power pulses appearing during the time intervals *t1* to *t2* and *t3* to *t4* effect corresponding output pulses during these time intervals at the terminal 25.

If an input pulse should be applied from the source 24 during a time interval *t4* to *t5*, however, a current will be caused to pass through the winding 22 in a direction tending to move the core 20 from its plus remanence operating point to its minus remanence operating point in this time interval. The next subsequently applied positive-going power pulse from the source 23 will therefore cause the core 20 to operate along a substantially unsaturated portion of its hysteresis loop between its minus remanence and its plus remanence operating points. For this particular state of operation, the winding 21 exhibits a relatively high impedance and little if any output will appear at the terminal 25 during the time interval *t5* to *t6*. If no further input pulse is applied, for instance during the time interval *t6* to *t7*, the core 20 will once more be driven from its plus remanence to its positive saturation region by the next positive-going power pulse, again effecting a corresponding output at the terminal 25.

Thus, examining the waveforms of Figure 2, it will be seen that in the absence of input pulses, the amplifier circuit shown provides regularly occurring output pulses in coincidence with the applied power pulses; while the application of a signal input during a negative-going power pulse portion will inhibit an output pulse during the next subsequent positive-going power pulse. The device thus provides output pulses in the absence of an input pulse, and provides no output pulse following the application of an input pulse, whereby the device acts as a complementer.

Again, referring to Figure 3, it will be seen that a non-complementing magnetic amplifier, such as may be employed in the practice of the present invention, may again utilize a magnetic core 30, preferably but not necessarily exhibiting a substantially rectangular hysteresis loop. The core 30 again carries two windings thereon, namely, a power or output winding 31 and a signal or input winding 32. One end of the power winding 31 is coupled via rectifying means to a source 33 of regularly occurring power pulses of the configuration shown in Figure 4A. One end of the signal or input winding 32 is coupled via rectifying means to a source 34 of selectively applied input pulses.

If we should now assume that the core 30 is initially at its minus remanence operating point, a positive-going power pulse from the source 33, applied for instance during the time interval *t1* to *t2*, will drive the core 30 from its minus remanence operating point to its plus remanence operating point during this time interval. As was mentioned previously, the winding 31 exhibits a relatively high impedance for this state of operation and substantially no output will appear at the output point 35 during the time interval *t1* to *t2*. During the next subsequent time interval *t2* to *t3*, when the applied power pulse is negative-going, in the absence of a signal being applied by source 34, a reverse current will flow from ground, through the rectifier D, through the said winding 31, and thence through the resistor R to a source of negative potential −V2. The magnitude of this reverse current flow is sufficient to flip the core 30 from its plus remanence operating point to its minus remanence operating point during the time interval *t2* to *t3*, whereby the next positive-going power pulse from the source 33, applied for instance during the time interval *t3* to *t4*, will once more drive the core 30 along the high impedance operating path on its hysteresis loop without effecting an output signal at the terminal 35.

If an input pulse should be applied from the source 34 during the time interval *t4* to *t5*, however, a current will flow through the signal winding 32 in a direction producing a magnetomotive force in core 30 in opposition to that effected by the aforesaid reverse current flow through winding 31, during this same time interval. The application of an input pulse will therefore cause the core 30 to remain at its plus remanence operating point, whereby the next subsequent positive-going power pulse, applied, for instance, during the time interval *t5* to *t6*, will drive the core 30 into positive saturation, thereby, effecting an output pulse at the terminal 35. In the absence of a further input pulse, during the time interval *t6* to *t7*, the reverse current flow through winding 31 will again flip the core to its minus remanence operating point and the device will revert to a non-output producing state.

Thus, examining the waveforms of Figure 4, it will be seen that the device of Figure 3 produces no output pulses in the absence of an input thereto, and is responsive to an input pulse applied during a negative-going power pulse portion for effecting an output pulse during the next subsequent positive-going power pulse. The device thus acts as a non-complementing magnetic amplifier.

Amplifiers of the type discussed in reference to Figures 1 through 4 may be interconnected, in accordance with the present invention, to provide pulse control and pulse generating circuits capable of wide utilization in pulse type apparatuses, such as computation devices. In a simple form, shown in Figure 5, such a pulse generating and pulse control circuit may comprise a complementing amplifier 40 having its output coupled to the input of a non-complementing amplifier 41 and the output of the said non-complementing amplifier 41 is in turn coupled to the input of the complementer 40. Outputs may be taken from either one or both of the amplifiers shown, for instance at the output terminals 42 and 43.

Referring now to the waveforms of Figure 6, it will be seen that during a time interval *t1* to *t2*, a positive-going phase 1 power pulse is applied to the complementer 40 whereby the said complementer 40 produces an output pulse during this time interval. This output pulse will appear at the output terminal 42 and is further fed to the input of non-complementer 41 whereby it acts as a phase 2 input thereto. Non-complementer 41 therefore produces a further output pulse during the time interval *t2* to *t3*, which further output pulse will appear at the terminal 43 and is also fed back to the input of complementer 40 during this time interval, acting as a phase 1 signal input to the said complementer 40. The complementer, therefore, produces no output during the time interval *t3* to *t4*, whereby non-complementer 41 produces no output during the next subsequent time interval *t4* to *t5*; the absence of an output pulse from the said non-complementer 41 during this time interval *t4* to *t5* results in there being no inhibition signal applied to the complementer 40 during this time interval, whereby the complementer 40 produces a further output pulse during the time interval *t5* to *t6*; and the cycle repeats.

Thus, examining the waveforms of Figures 6C and 6D, it will be seen that for the particular arrangement utilizing a single complementer and a single non-complementer, connected in a closed ring configuration, as shown in Figure 5, each of the amplifiers will produce an output pulse followed by a no-output state and the output pulses of the several amplifiers are in fact time delayed or phase shifted with respect to one another. Such a device finds ready utility in many forms of pulse circuits, and in particular, reference is made, for instance, to my copending application Serial No. 459,630, filed October 1, 1954, for: "Phase Responsive Bistable Devices," now Patent Number 2,783,456, which Patent teaches the use of a circuit similar to that shown in Figure 5 for effecting plural stable states represented by pulse outputs occurring during preselected time intervals.

The arrangement of Figure 5 is in fact a very special case of the present invention, and the concepts thereof may be expanded, as is shown in Figure 7, by employing a complementing magnetic amplifier in conjunction with a plurality of non-complementers, again connected in a closed ring configuration. In the particular example of Figure 7, a single complementer and three non-complementers have been shown. In practice, however, the arrangement of Figure 7 is meant to illustrate but one further form of the general case wherein a single complementing amplifier and $(2N+1)$ non-complementing amplifiers are employed in a closed ring configuration, N being an integer greater than or equal to zero. When this general case is in fact utilized, it will be found that the device operates as a multivibrator wherein there are recurrent series of $N+1$ output pulses followed respectively by time intervals corresponding to $N+1$ pulses.

Thus, in the case of Figure 5, wherein N equals zero, the device operates to produce and omit output pulses during alternate output time intervals in each of the amplifiers. In the case of Figure 7, where N equals 1, the device operates to provide at the output of each of said amplifiers, two output pulses followed by omission of two output pulses; and by the same analogy, when N equals an integer greater than one, each amplifier in the closed ring configuration will provide recurrent series of $N+1$ output pulses followed by non-output producing intervals corresponding to $N+1$ further pulse times. This generalized form of the present invention operates, as will be seen from an examination of Figures 7 and 8, in the manner described, inasmuch as the complementing amplifier utilized will produce regularly occurring output pulses tending to "fill up" the non-complementing amplifier chain; and this non-complementing amplifier chain will thereafter produce continuous inhibiting inputs to the complementing amplifier until the said non-complementing amplifier chain is "empty" of pulses.

This operation will become more readily apparent from the waveforms of Figure 8, which describe the operation of the circuit shown in Figure 7, utilizing a single complementing amplifier 50 in conjunction with three non-complementing amplifiers 51, 52 and 53 connected in a closed ring; outputs being taken selectively at any of the points 54 through 57 inclusive. Thus, referring to the waveforms of Figure 8, it will be seen that during a time interval *t1* to *t2*, the complementing amplifier 50 will produce an output pulse which acts as a phase 2 input to the non-complementing amplifier 51. Amplifier 51 thus produces an output pulse during the time interval *t2* to *t3*, which acts as a further input to the amplifier 52; and the amplifier 52 thereafter produces a still further output pulse during the time interval *t3* to *t4*, acting as an input to the amplifier 53 during this same time interval. No input pulses are coupled to the complementing amplifier 50 during the time interval *t1* to *t4*, inasmuch as this time period is utilized to "fill up" the non-complementer chain utilizing the three non-complementers shown. Complementing amplifier 50 therefore produces two output pulses during this time interval, and more specifically during the time intervals *t1* to *t2* and *t3* to *t4*.

The output pulse from non-complementer 53, during the time interval *t4* to *t5*, however, acts as a phase 1 input pulse to the complementing amplifier 50, inhibiting any output therefrom during the time interval *t5* to *t6*. A similar inhibiting output occurs from the non-complementer 53 during the time interval *t6* to *t7*, again inhibiting an output from the complementer 50 during the time interval *t7* to *t8*. Thus, once the non-complementing amplifier chain has been "filled up," inhibiting outputs will be continually supplied to the complementer 50 until this non-complementer chain has been "emptied" of pulses.

In operation, therefore, the complementing amplifier 50 provides a first series of output pulses during the time period required to fill up the non-complementer chain and is then inhibited from producing outputs during the time period required for this non-complementer chain to be emptied of pulses. A similar pulse sequence appears at the output of each of the non-complementers in the non-complementer chain inasmuch as these amplifiers require input pulses to produce output pulses, and will not produce any output pulses in the absence of inputs thereto. However, because of the time delay effected between the application of an input pulse to a non-complementing amplifier and the appearance of an output pulse from such a non-complementing amplifier, the output pulse trains from each of the complementing and non-complementing amplifiers are time delayed or phase shifted with respect to one another. In this respect it should be noted that each of the non-complementers shown in Figure 7, and for that matter in any of the other embodiments of the present invention, may be replaced by suitable passive delay means exhibiting a time delay corresponding to one-half the pulse period; and it should therefore be understood that throughout the present description and in the appended claims, the term "non-complementing amplifier" is meant to include the substitution of such passive delay means.

As will be appreciated from the foregoing discussion, a generalized form of one embodiment of the present invention thus utilizes a single complementing amplifier and an odd-number plurality of non-complementing amplifiers, connected in a closed ring configuration. In practice, an even number of total amplifiers are employed in the closed ring, and these amplifiers are alternately energized by power pulses of differing phases so that the output pulse of each amplifier in the closed ring may act as an input pulse to the next subsequent amplifier in the said ring.

In accordance with a modification of the present invention, however, further desirable results may be achieved by utilizing more than one complementing amplifier; for instance, two complementers in conjunction with a further plurality of non-complementers, the total amplifiers in the chain again comprising an even number. One such form of this further embodiment of the present invention is shown in Figure 9, wherein two complementers 60 and 61 are connected in cascade, and these complementers operate in conjunction with two further non-complementers 62 and 63, again connected in cascade, all the said amplifiers being interconnected in a closed ring configuration, as shown. It must be understood, of course, that the arrangement of Figure 9 is again meant to illustrate one case of a more general device wherein an even number of complementers and 2N non-complementers are connected in a closed ring configuration, N being an integer greater than or equal to one.

The device of Figure 9 again operates as a pulse type digital multivibrator of the type discussed previously, but is further characterized by the fact that it exhibits at least three stable states which may be effected by supplying successive inputs to the input 1 terminal 64, the input 2 terminal 65 and the input 3 terminal 66. Signals applied to the terminal 64 are coupled, as shown, to the input of non-complementing amplifier 62. Signals applied to the terminal 65 are coupled, as shown, to the inputs of both complementing amplifier 60 and non-complementing amplifier 62; and inputs applied to the terminal 66 are coupled to the input of complementing amplifier 61. It must be understood that the particular signal input arrangement shown is merely illustrative and that many other arrangements may be provided for coupling signals to the amplifier chain and for causing the said device to move from one to another stable state; one such further configuration, for instance, comprising selectively breaking the feedback loop from the output of amplifier 63 to the input of complementer 60 during appropriate time intervals.

The tristable operation of the circuit shown in Figure 9 will now be described with reference to the waveforms of Figure 10. In this respect it should be noted that Figure 10C illustrates three control inputs labelled respectively 1, 2 and 3, these designations being employed to identify signals appearing successively at the input 1 terminal 64, the input 2 terminal 65 and the input 3 terminal 66.

Examining the operation of the device shown in Figure 9, let us therefore assume that a signal input pulse is coupled to the terminal 64 during the time interval *t2* to *t3*. This pulse is coupled to the input of amplifier 62 and causes the said amplifier 62 to produce an output pulse during the time interval *t3* to *t4* (Figure 10F). The complementer 60 also produces an output pulse during this time interval *t3* to *t4* inasmuch as no inhibition is applied from the output of amplifier 63, nor from any of the other input terminals during this time interval; and the output of the said complementer 60, during the time interval *t3* to *t4*, serves to inhibit any output from the complementer 61, during the time interval *t4* to *t5*. The output of amplifier 62, however, acts as a phase 2 input to the non-complementer 63 during this time interval *t3* to *t4*, whereby non-complementer 63 produces a further output pulse during the time interval *t4* to *t5* (Figure 10G). The output of non-complementer 63 thus acts as a phase 1 input to the complementer 60 inhibiting any output therefrom during the time interval *t5* to *t6* (Figure 10D), whereby the complementer 61 produces an output pulse during the time interval *t6* to *t7* (Figure 10E), acting as a phase 1 input to non-complementer 62. Amplifier 62 therefore produces a still further output pulse during the time interval *t7* to *t8* and inasmuch as the complementer 60 is not inhibited by any output from the non-complementer 63 during the time interval *t6* to *t7*, this complementer 60 also will produce an output pulse during the time interval *t7* to *t8*.

To summarize the foregoing, it will be seen that upon application of a pulse at the input terminal 64, during the time interval *t2* to *t3*, the device will commence to operate, for instance during the total time interval *t2* to *t12*, in such a manner that each of the complementing amplifiers 60 and 61 and each of the non-complementers 62 and 63 produces output pulses during alternate power pulse cycles, respectively time shifted from one another.

If now a further input pulse should be applied to the terminal 65, during the time interval *t12* to *t13* (Figure 10C), this further input pulse will be coupled to both the input of complementer 60 and to the input of non-complementer 62. Complementer 60 will therefore produce no output pulse during the time interval *t13* to *t14*, while non-complementer 62 will produce an output pulse during this time interval *t13* to *t14*, which acts as an input to the non-complementer 63. The lack of output from the complementer 60 during the time interval *t13* to *t14* also permits complementer 61 to produce an output during the time interval *t14* to *t15* which acts as a still further input to the non-complementer 62 during the time interval *t15* to *t16*. The output of non-complementer 63 acts as a further inhibition input to complementer 60 during the time interval *t14* to *t15*, whereby complementer 60 again produces no output during the time interval *t15* to *t16*, permitting complementer 61 to produce still another output during the time interval *t16* to *t17*, etc.

To summarize the foregoing operation, the application of an input to terminal 65 during the time interval *t12* to *t13*, for instance, inhibits complementer 60, permits complementer 61 to produce an output pulse, and starts a continuous pulse train through the amplifiers 61, 62 and 63, the pulses of which continually inhibit the operation of complementer 60. Thus, a second stable state is achieved wherein only the three amplifiers 61, 62 and 63 produce output pulses, while complementer 60 is continually inhibited from producing such pulses, in contradistinction to the first stable state wherein all the amplifiers produced output pulses.

If we should now further assume that an input pulse is applied to terminal 66 during the time interval *t21* to *t24*, for instance, the device will assume a still further stable state. As will become apparent from the subsequent description of this third stable state, the particular signal input arrangement shown in Figure 9 requires that the input at terminal 66 be of the configuration shown in Figure 10C, or in the alternative, one wherein two successive pulses appear respectively during the time intervals *t21* to *t22* and *t23* to *t24*. This particular input pulse arrangement is required to permit the non-complementers 62 and 63 to be emptied of pulses before transition to the third stable state is achieved. Thus, assuming that the device is in its second stable state, the input pulse portion applied from terminal 66 to the input of complementer 61, during the time interval t21 to t22, will inhibit an output from the said complementer 61 during the time interval t22 to t23, thereby breaking the train of pulses passing from the said complementer 61 into the non-complementer chain. An output pulse still appears from the non-complementer 63 during the time interval t22 to t23, however, which inhibits the complementer 60 during the time interval t23 to t24, and this inhibition of complementer 60 would normally permit complementer 61 to produce an output pulse during the time interval t24 to t25. This particular further output pulse from the complementer 61 is, however, again inhibited by the input pulse portion appearing at the terminal 66 during the time interval t23 to t24. Inasmuch as no further output pulse appears from the non-complementer 63 during the time interval t24 to t25, complementer 60 now produces an output pulse during the time interval t25 to t26, which again inhibits the complementer 61; and since the chain of non-complementers has now been emptied of pulses, the complementer 60 will continue to produce output pulses inhibiting outputs from the complementer 61 and preventing the chain of non-complementers from being refilled.

Figure 10:
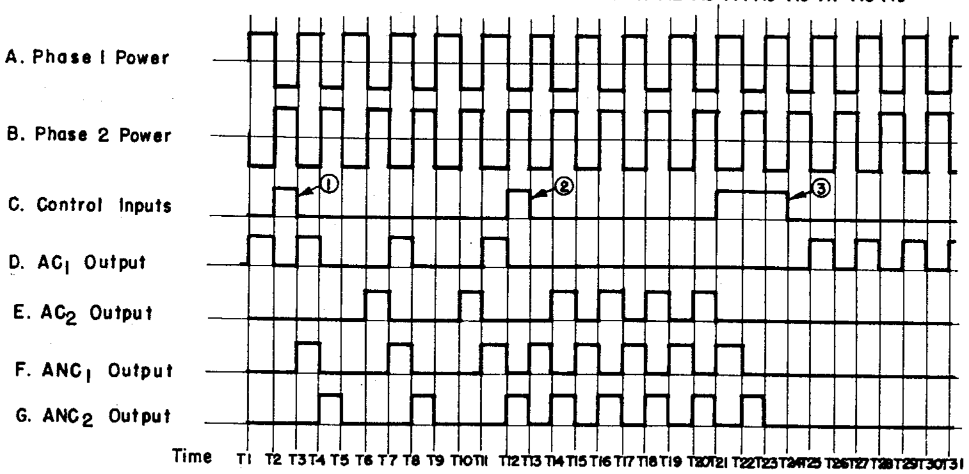
Figure 10 (A through G) are waveforms illustrating the operation of the circuit shown in Figure 9.

Thus, referring to the wave forms of Figure 10 for the time interval t25 to t30, it will be seen that a third stable state has been achieved in which only the complementer 60 produces outputs, and no outputs are produced from any of the other amplifiers in the closed ring.

While I have described preferred embodiments of the present invention, many variations will be readily suggested to those skilled in the art. In particular, it should be noted that the more general cases of the several embodiments of my invention, as discussed previously, are ordinarily employed to permit any desired pulse output configuration to be achieved; and outputs may be taken from any one or more of the amplifiers utilized to effect the various time shifted pulses required for proper operation of more complex pulse devices. Again, each of the devices shown are characterized by two or more stable states of operation, and the various embodiments of the present invention may be modified to cause the devices to operate stably in preselected ones of these states. In this latter respect, of course, input pulses may be supplied to various of the amplifiers to cause the desired stable operation.

Again, while particular magnetic amplifiers have been disclosed, it must be understood that other forms of such circuits may be employed and in fact the broad concepts of the present invention may be utilized in respect to complementing and non-complementing pulse type amplifiers in general. It is therefore to be understood that the foregoing discussion is means to be illustrative only and is not limitative of my invention; and the true scope of my invention is as set forth in the appended claims.

Having thus described my invention, I claim:

1. A free-running multivibrator for producing output pulses occurring in series groups which are respectively spaced from one another by plural predetermined time intervals, comprising K complementing amplifiers, K being an integer greater than or equal to one, N delay devices, N being an integer greater than or equal to one, means coupling said K complementing amplifiers in cascade thereby to effect a complementing amplifier section having an input and an output, means coupling said N delay devices in cascade thereby to effect a delay section having an input and an output, means coupling the output of said amplifier section to the input of said delay section and the output of said delay section to the input of said amplifier section, and means for taking output signals from selected ones of said delay devices.

2. The multivibrator of claim 1 wherein at least one of said N delay devices comprises a non-complementing amplifier.

3. The multivibrator of claim 1 wherein each of said complementing amplifiers comprises a pulse type magnetic amplifier.

4. A multivibrator for producing recurrent series of spaced signals followed respectively by plural no-signal time intervals, comprising a complementing magnetic amplifier, an odd-numbered plurality of delay devices connected in cascade, means coupling the output of said amplifier to the input of said cascade connected delay devices, means connecting the output of said cascade connected delay devices to the input of said amplifier, and means for taking outputs from said magnetic amplifier and from selected ones of said delay devices.

5. The multivibrator of claim 4 wherein said amplifier comprises a pulse type magnetic amplifier including a core of magnetic material exhibiting a substantially rectangular hysteresis loop.

6. The multivibrator of claim 4 wherein each of said delay devices comprises a non-complementing amplifier.

7. Pulse generating means for producing a predetermined plurality of successive pulses followed by an elongated no-pulse time interval, comprising K pulse type complementing amplifiers forming a selective pulse generating section having an output and a control input, K being an integer greater than or equal to one, a pulse control section having an output and an input and comprising N pulse type non-complementing amplifiers connected in cascade, N being an integer greater than or equal to one and the sum of K and N being an even number, means coupling the output of said pulse generating section to the input of said pulse control section thereby to form a continuous amplifier chain, means coupling the output of said pulse control section to said control input of said pulse generating section thereby to control the operation of said complementing amplifiers, and means for taking output signals from selected ones of the amplifiers in said amplifier chain.

8. The pulse generating means of claim 7 wherein alternate amplifiers in said amplifier chain are coupled to a first source of regularly occurring power pulses, and a second source of regularly occurring power pulses coupled to the remaining amplifiers in said chain, the pulses from said first and second power pulse sources occurring respectively during alternate time periods.

9. The pulse generating means of claim 8 wherein each of said complementing and non-complementing amplifiers comprises a magnetic amplifier including a core of magnetic material exhibiting a substantially rectangular hysteresis loop.

10. Pulse generating means comprising a pulse type complementing amplifier, an odd-numbered plurality of non-complementing amplifiers connected in cascade, means coupling the output of said complementing amplifier to the input of said cascade connected non-complementing amplifiers thereby to provide a continuous amplifier chain, means coupling the output of said cascade connected non-complementing amplifiers to the input of said complementing amplifier, and means for taking pulse outputs from selected ones of said amplifiers in said amplifier chain.

11. The pulse generating means of claim 10 wherein said complementing amplifier and each of said non-complementing amplifiers comprises a pulse type magnetic amplifier.

12. The pulse generating means of claim 11 wherein each of said amplifiers includes a core of magnetic material exhibiting a substantially rectangular hysteresis loop.

13. Pulse generating means comprising a pair of complementing amplifiers connected in a cascade group, 2N non-complementing amplifiers connected in a cascade group, N being an integer greater than or equal to one, means connecting the output of each of said cascade groups to the input of the other of said cascade groups, and means for coupling control signals to selected amplifiers in said cascade groups thereby to cause said interconnected amplifiers to assume different pulse generating stable states.

14. The pulse generating means of claim 13 wherein each of said complementing and non-complementing amplifiers comprises a pulse type magnetic amplifier.

15. Signal control means for producing recurrent groups of plural successive signals, said groups being followed respectively by recurrent elongated time intervals, comprising a complementing amplifier producing output signals in the absence of input signals thereto, a plurality of non-complementing amplifiers connected in cascade to the output of said complementing amplifier, whereby signal outputs from said complementing amplifier effect further signals successively passing through said cascade connected non-complementing amplifiers, and means coupling the output of said cascade connected non-complementing amplifiers to the input of said complementing amplifier to periodically inhibit outputs from said complementing amplifier for a time interval corresponding to that required for said further signals successively to pass through said cascade connected non-complementing amplifiers.

16. The signal control means of claim 15 wherein said complementing and non-complementing amplifiers comprise pulse type magnetic amplifiers.

17. The control means of claim 16 wherein each of said magnetic amplifiers includes a core of magnetic material exhibiting a substantially rectangular hysteresis loop.

18. Signal means comprising K complementing amplifiers forming a signal generating section having input and output terminals, K being an integer greater than or equal to one, a signal control section having input and output terminals and comprising N interconnected non-complementing amplifiers, N being an integer greater than one, means coupling the output terminal of said signal generating section to the input terminal of said signal control section, and means coupling the output terminal of said signal control section to the input terminal of said signal generating section.

19. The combination of claim 18 wherein each of said complementing and non-complementing amplifiers comprises a pulse type amplifier, said complementing and non-complementing amplifiers being connected in cascade with one another, the summation of N and K being an even integer, and power pulse means for regularly energizing alternate ones of said pulse type amplifiers with power pulses of opposing phases respectively.

20. Pulse generating means comprising a plurality of pulse type amplifiers connected in cascade with one another in a closed ring configuration, said plurality of amplifiers comprising at least one complementing amplifier and a plurality greater than one of non-complementing amplifiers.

21. The combination of claim 20 wherein each of said pulse type amplifiers comprises a magnetic amplifier, means for energizing selected ones of said magnetic amplifiers with regularly occurring power pulses of a first phase, and means for energizing other ones of said magnetic amplifiers with regularly occurring power pulses of a second phase different from said first phase.

22. Pulse generating means comprising a pulse type complementing amplifier, a source of regularly occurring energizing pulses coupled to said amplifier whereby said amplifier produces regularly occurring output pulses in the absence of an input pulse thereto, and feedback delay means coupling the output of said amplifier to the input of said amplifier whereby pulses recirculate between said amplifier output and input via said delay means, said delay means including means producing a pulse delay time equal to the occurrence time of a plurality greater than one of said energizing pulses, whereby said complementing amplifier regularly produces a predetermined plurality of output pulses and said amplifier is thereafter regularly inhibited by delayed feedback pulses for a predetermined time interval corresponding to occurrence of a plurality of said energizing pulses.

23. Pulse generating means for producing recurrent series of $(N+1)$ spaced pulses followed respectively by recurrent series of $(N+1)$ spaced no-pulse time intervals, where N is an integer greater than or equal to 1, comprising a single pulse-type complementing amplifier, a plurality $(2N+1)$ of pulse-type non-complementing amplifiers, said complementing amplifier and plurality of non-complementing amplifiers being respectively connected to one another in a closed ring configuration with the output of each amplifier in said ring feeding the input of the next successive amplifier in said ring, means for energizing said complementing amplifier and each of said non-complementing amplifiers in said ring with a train of regularly spaced power pulses, the power pulse trains energizing successive ones of said amplifiers in said ring being respectively of alternately opposite phases, and output means for taking said recurrent series of $(N+1)$ spaced pulses from the output of a selected one of said ring-connected complementing and non-complementing amplifiers.

24. Pulse generating means for producing recurrent series of $(N+1)$ spaced pulses followed respectively by $(N+1)$ spaced no-pulse time intervals, where N is an integer greater than or equal to one, comprising a pulse-type complementing amplifier having an input and an output, an energizing source of power pulses coupled to said complementing amplifier for energizing said amplifier with a train of regularly spaced power pulses whereby said complementing amplifier is normally operative, during occurrence of each of said energizing power pulses, to produce an output pulse at said amplifier output in the absence of an input pulse at said amplifier input, and delay means coupling the output of said complementing amplifier to the input of said complementing amplifier, said delay means including means interposing a time delay of $(2N+1)$ time intervals between the occurrence of an output pulse at the output of said complementing amplifier and the coupling of said output pulse via said delay means to the input of said complementing amplifier.

References Cited in the file of this patent

UNITED STATES PATENTS

| | | |
|---|---|---|
| 2,591,406 | Carter | Apr. 1, 1952 |
| 2,644,897 | Lo | July 7, 1953 |
| 2,652,501 | Wilson | Sept. 15, 1953 |
| 2,695,993 | Haynes | Nov. 30, 1954 |
| 2,706,811 | Steele | Apr. 19, 1955 |
| 2,709,798 | Steagall | May 31, 1955 |
| 2,710,928 | Whitney | June 14, 1955 |
| 2,710,952 | Steagall | June 14, 1955 |
| 2,729,755 | Steagall | Jan. 3, 1956 |
| 2,729,808 | Auerbach et al. | Jan. 3, 1956 |
| 2,772,370 | Bruce et al. | Nov. 27, 1956 |